United States Patent
Gujral (10) Patent No.: US 11,089,084 B2
(45) Date of Patent: Aug. 10, 2021

(54) WEBSITE FAILURE ANALYSIS

(71) Applicant: MACHINE COVER, INC., Wenham, MA (US)

(72) Inventor: Inder-Jeet Singh Gujral, Wenham, MA (US)

(73) Assignee: Machine Cover, Inc., Wenham, MA (US)

(*) Notice: Subject to any disclaimer, the term of this patent is extended or adjusted under 35 U.S.C. 154(b) by 95 days.

(21) Appl. No.: 16/521,050

(22) Filed: Jul. 24, 2019

(65) Prior Publication Data
US 2020/0036771 A1 Jan. 30, 2020

Related U.S. Application Data

(60) Provisional application No. 62/702,502, filed on Jul. 24, 2018.

(51) Int. Cl.
*H04L 29/08* (2006.01)
*H04L 12/26* (2006.01)
*H04L 12/24* (2006.01)

(52) U.S. Cl.
CPC ........... *H04L 67/025* (2013.01); *H04L 41/16* (2013.01); *H04L 43/0817* (2013.01); *H04L 43/0852* (2013.01); *H04L 43/0894* (2013.01)

(58) Field of Classification Search
CPC ... H04L 67/025; H04L 41/16; H04L 43/0817; H04L 43/0852; H04L 43/0894
See application file for complete search history.

(56) References Cited

U.S. PATENT DOCUMENTS

| | | | |
|---|---|---|---|
| 6,138,157 A * | 10/2000 | Welter | G06F 11/3688 709/224 |
| 7,107,339 B1 * | 9/2006 | Wolters | H04L 41/142 709/224 |
| 2002/0174421 A1 * | 11/2002 | Zhao | H04L 41/22 717/174 |
| 2009/0100154 A1 * | 4/2009 | Stevenson | G06Q 30/02 709/220 |
| 2014/0280182 A1 * | 9/2014 | Anderson | G06F 11/3409 707/741 |
| 2017/0149631 A1 * | 5/2017 | Brown | H04L 67/02 |
| 2018/0373885 A1 * | 12/2018 | Arad | G06F 21/629 |

* cited by examiner

*Primary Examiner* — Wing F Chan
*Assistant Examiner* — Billy H Ng
(74) *Attorney, Agent, or Firm* — Nixon & Vanderhye P.C.

(57) ABSTRACT

By determining the probability of website impairment for a subject web page, a price for an impairment warranty may be defined. A baseline time to first byte is determined for a plurality of websites, and an impaired state model is defined for a subset of the plurality of websites. Occurrences of impaired states for each website in the subset is determined. Using the impaired state model, websites among the plurality of websites having a probability of an impaired state are determined, and a frequency of impairment occurrence for all of the plurality of websites is measured. With this data, the probability of website impairment for the subject web page may be calculated.

14 Claims, 4 Drawing Sheets

WEBSITE FAILURE ANALYSIS

CROSS-REFERENCES TO RELATED APPLICATIONS

This application claims the benefit of U.S. Provisional Patent Application No. 62/702,502, filed Jul. 24, 2018, the entire content of which is herein incorporated by reference.

STATEMENT REGARDING FEDERALLY SPONSORED RESEARCH OR DEVELOPMENT (NOT APPLICABLE)

BACKGROUND

The invention relates to website failure analysis and, more particularly, to methods for measuring probability of website impartment over a predefined period of time.

The United States property and casualty insurance market is roughly 450 billion dollars per year. Despite its size, the industry is essentially going sideways in terms of annual revenue. The industry relies on traditional channels (MGAs, agents, brokers) for the vast bulk of its revenue. The value-chain contains a large number of intermediaries, each of which has been historically "necessary." The insurance industry business model relies upon an intervention-heavy way of determining the exact loss suffered by an insured, and then trying to find ways to minimize the payout related to that loss. Additionally, the insurance industry is heavily regulated, at the state level in the U.S. and at national levels in most other countries.

BRIEF SUMMARY

The methods of the described embodiments address a fast-growing subset of the total insurance industry sector. The methods embody a less-regulated product as sales don't always depend on traditional insurance channels. Additionally, the offerings are add-on sales rather than cold-call sales. The process may be fully automated end-to-end. Offerings can be sold per event or per month, rather than just per year, which allows for suitable and timely market price adjustments. The methods can enable the insurance industry to generate revenue from non-insurance channels.

In an exemplary embodiment, a method of measuring probability of a single asystemic website impairment event over a predefined period of time of a subject web page includes the steps of (a) determining a historical frequency of firing events across multiple websites by: (1) conducting a first scan of the multiple websites, and measuring a time to first byte for each of the multiple websites, and (2) conducting a second scan of the multiple websites, and measuring contextual values that affect normalcy/impairment of the subject web page; (b) performing supervised training by selecting a subset of the multiple websites, defining an impaired state model for each website in the subset of the multiple websites, and identifying occurrences of impaired states for each website in the subset of the multiple websites; (c) analyzing a result of the first scan to identify websites among the multiple websites having a probability of an impaired state based on the impaired state model defined in the supervised training performed in step (b); (d) measuring from the analyzing in step (c) a frequency of occurrence of global firing events for all of the multiple websites; and (e) calculating a probability of local firing events for the subject web page.

The method may further include determining a correlation of the contextual values measured in step (a) to the probability of the impaired state, and adjusting the probability. The contextual values may include at least one of web server type, operating system type, and web site host provider.

The first scan may be conducted at a higher frequency than the second scan. For example, the first scan may be conducted every 5-10 minutes, and the second scan may be conducted once per month and at pre-designated times. In this context, the second scan may be conducted when a web page size changes and/or when an impairment state is detected.

Step (a)(1) may include measuring a time to last byte for each of the multiple websites.

Prior to step (a), the method may include identifying the multiple websites, and installing software that is capable of monitoring the multiple websites on an Internet-connected server, wherein step (a) is practiced by running the software such that the Internet-connected server requests each of the multiple websites to serve its home page, measuring an elapsed time between when the request was made and when the home page began to arrive, and preserving data values obtained from each request linked with an identity of each of the multiple websites.

The impaired state model may identify a normal range for the time to first byte for each website in the subset of the multiple websites, where the impaired state model defines the impaired states when the time to first byte exceeds the normal range by at least 100-1000%. In this context, the impaired state model may define the impaired states when the time to first byte exceeds the normal range for a predetermined period of time.

In another exemplary embodiment, a method of determining a probability of website impairment for a subject web page in order to define a price for an impairment warranty includes the steps of (a) determining a baseline time to first byte for a plurality of websites; (b) defining an impaired state model for a subset of the plurality of websites, and identifying occurrences of impaired states for each website in the subset; (c) using the impaired state model defined in step (b), identifying websites among the plurality of websites having a probability of an impaired state; (d) measuring a frequency of impairment occurrence for all of the plurality of websites; and (e) calculating the probability of website impairment for the subject web page based on the frequency measured in step (d).

BRIEF DESCRIPTION OF THE DRAWINGS

These and other aspects and advantages will be described in detail with reference to the accompanying drawings, in which.

DETAILED DESCRIPTION

The availability of any web page from a website to an end-user may be measured by the time taken to receive the first byte of the page or a message indicating that the page will never be received. Similar conclusions may be drawn from the time taken to receive the last byte of the requested page.

Let us consider as an example, one arbitrary website. If we request the same web page from this website every few minutes, the moment when this web page starts arriving (and when it stops arriving), will obviously vary across the various requests. Successive measurements of this moment yield values that belong to one of the two categories below:

Normal—i.e. while the specific measurements may vary, all the values may broadly be considered normal with respect to this website. So for example, if the website is operating "normally" and the successive measurements of time-to-first-byte for this web page are in the range 0.9 seconds to 1.2 seconds, then measurements of 0.8 seconds or 1.3 seconds will likely also be considered "normal". Note that this definition of normalcy is with respect to this website and this requester. In general, if a measurement varies from the normal range in being smaller (faster), that is not a problem and enough of those may lead to a "new normal".

Impaired—i.e. a given measurement is so far from what is normal for this website that the user may be annoyed due to slowness, or may simply give up and go elsewhere because the requested webpage takes so long to load, or simply does not load at all.

Impairment Event

An impairment event is defined as a sequence of measurements that begin at normal, move to impaired and then return to normal, and where the time while impaired is N.

Asystemic Impairment Event

Let us assume that web page A has an impairment event. If >M % of a set of (defined) reference web pages from various websites do not suffer an impairment event over the same time period, then the impairment event suffered by A is called an Asystemic Impairment Event (i.e., the problem is likely specific to A rather than being part of some broader problem).

Firing Event

A firing event is an asystemic impairment event where the impairment duration N falls within a specified range, i.e. x<=N<=y, where x and y are defined constants and where no production-affecting change has been made during P days preceding the start of the event.

Our Objectives a) Predict, for a given web page and a given minimum-maximum time range, the probability of occurrence of a single asystemic impairment event over the next X days (where X is specified) and thus be able to offer a price for a warranty that covers this firing event over those X days.

b) Assuming this warranty is purchased, to then monitor that web page for a firing event.

In order to do that, we would need to determine, for any web page, whether a given sequence of measurements constitutes a firing event or not, and thus the historical frequency of firing events across multiple websites, both on a "naïve" basis and also on the basis that the frequency of firing events may be affected by a variety of contextual variables.

This in turn means that we would need to:
(a) Perform Data-Gathering
(b) Perform Analysis of the gathered data in order to recognize asystemic impairment events.

Data-Gathering

Data-gathering consists of two separate scans, one occurring at high-frequency (e.g. every few minutes) and the other occurring at low-frequency (e.g. every month and also at other designated times). These scans run across every consequential website worldwide (the exact number is the websites that have enough traffic to be worth scanning—several million, at least).

The high-frequency scan measures the following things (among others):
Date+time when the request was sent out
Time to first byte
Time to last byte The low-frequency scan is intended to record a number of contextual values that may (or may not) affect normalcy/impairment of the relevant web page.

The purpose of data-gathering is to collect (and continue to collect on an ongoing basis) as much data as possible about the websites that are the subject of the scan.

Example

Figure 3:
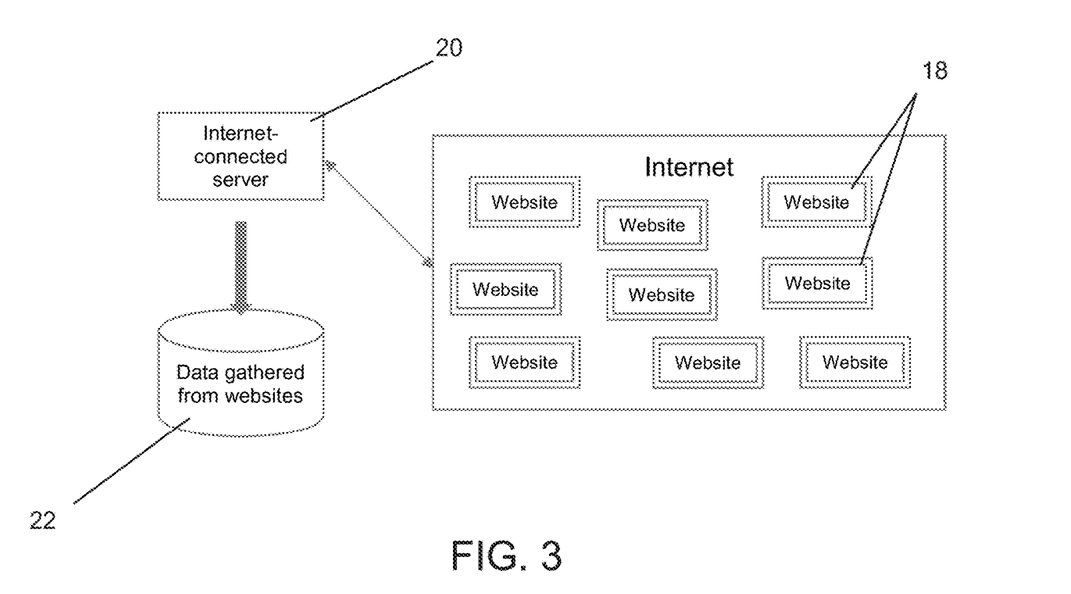
FIG. 3 is a schematic drawing showing system components.

With reference to FIG. 3, an example of how data-gathering may be performed, is as follows:

1. The system administrator makes a list of the N million websites 18 that are worth monitoring, i.e., websites where the owner may benefit from a warranty.

2. The system administrator places a body of known software that is capable of monitoring these websites, on one or more Internet-connected servers 20.

3. These servers 20 contain a list of the websites from which data is to be gathered (as listed in (1) above) and they systematically go through each entry in this list, requesting the relevant website 18 to serve its home-page (or other webpages if relevant) and measuring the elapsed time between when the request was made and when the page began to arrive (or the servers learned that the page was not available).

4. The time-to-start-of-arrival and related values obtained from each such attempt, are preserved along with the identity of the website to which they pertain.

5. In effect, each website in the list is queried in this way every few minutes.

The aggregate of the information is thus obtained and stored in a memory 22 and available to the Analysis phase, as outlined below.

Analysis

The process of analysis presupposes that data is continuing to be gathered, and "the more the merrier" as far as data is concerned. In general, the system uses a machine-learning subset of artificial intelligence.

(1) Supervised Training
(a) Establish a model for impaired states.
(b) Select a sample of websites and hand-tag measurement sequences for impaired states.
(2) Machine Analysis
(a) Use the results of the supervised training as a training set for the results of the high-frequency scan such that any measurement sequence can be machine-tagged with a probability of being impaired.

(b) Infer from the result of (a), the frequency of occurrence of firing events for all websites and thus the probability of firing events for a given website over a period of X days in the immediate future.

(3) Correlation with Contextual Variables

Finally, determine the correlation of each contextual value with the impairment frequency—i.e. is there an "impairment premium" or "impairment discount" if some of the contextual variables have particular values.

Example

An example of how to conduct analysis on the data gathered as indicated above, is to use any of the standard AI machine-learning toolkits available from the various cloud vendors (e.g., the SageMaker toolkit from the AWS cloud) and to conduct the analysis using the "supervised machine learning" process with the assumption that the gathered data follows the "logistic regression" model.

Figure 1:
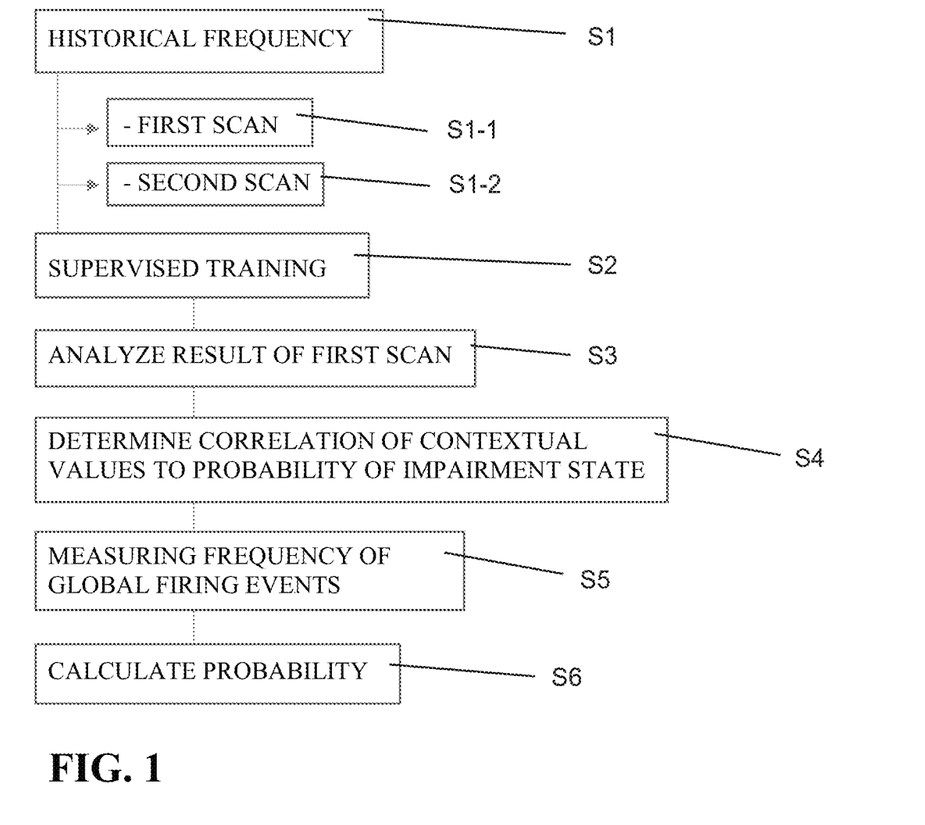
FIG. 1 is a flow diagram showing an exemplary method according to the described embodiments.
Figure 2:
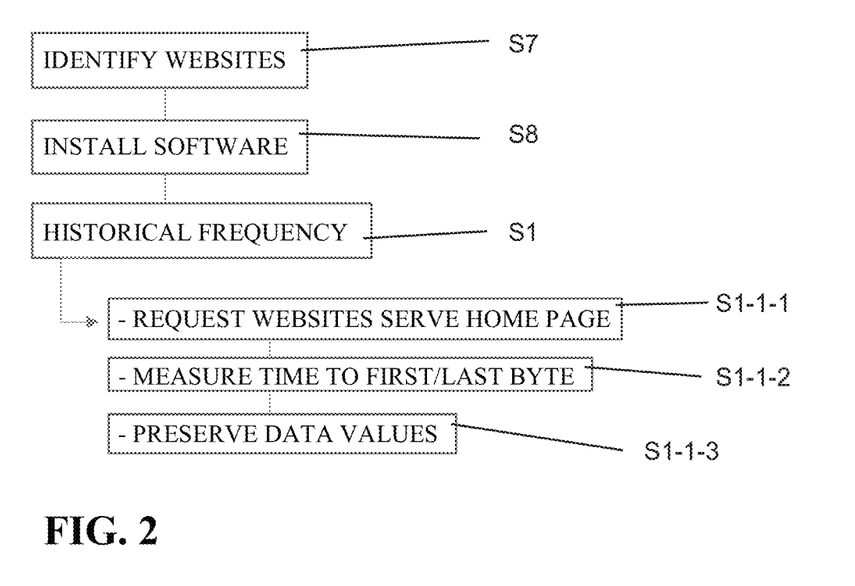
FIG. 2 is a flow diagram showing set up processes and details of determining firing event historical frequencies.

FIGS. 1 and 2 are flow diagrams showing the methodologies according to the described embodiments. In one embodiment, the method measures probability of a single asystemic website impairment event over a predetermined period of time for a subject web page. In step S1, a historical frequency of firing events across multiple websites is determined. This determination is made by (1) conducting a first scan of the multiple websites, and measuring a time to first byte for each of the multiple websites (S1-1), and (2) conducting a second scan of the multiple websites, and measuring contextual values that affect normalcy/impairment of the subject web page (S1-2). In some embodiments, the first scan is conducted every 5-10 minutes, whereas the second scan is conducted once per month and at predesignated times.

In step S2, supervised training is performed by selecting a subset of the multiple websites, defining an impaired state model for each website in the subset, and identifying occurrences of impaired states for each website in the subset. A result of the first scan (S1-1) is analyzed to identify websites among the multiple websites having a probability of an impaired state based on the impaired state model defined in the supervised training of step S2 (S3). Subsequently, from the analyzing in step S3, a frequency of occurrence of global firing events for all of the multiple websites is measured (S5). The probability of local firing events for the subject web page may be subsequently calculated (S6).

In defining the impaired state model in step S2, the impaired state model identifies a normal range for the time to first byte for each website in the subset of the multiple websites. This normal range can vary by website of course. The impaired state model may define the impaired states when the time to first byte exceeds the normal range by at least 100-1000%. In some embodiments, the impaired state model defines the impaired states when the time to first byte exceeds the normal range for a predetermined period of time.

With regard to the contextual values measured in S1-2, the methodology may also include determining a correlation of the contextual values to the probability of the impaired state and adjusting the probability (S4). The contextual values recorded may or may not affect normalcy/impairment of the relevant web page. Among other things, the list of items recorded in the low-frequency scan includes, for example, one or more of web server time, operating system (OS) type, website host provider, etc. In some embodiments, the second scan is run at least once each month and also when the page size changes and/or whenever there is an impairment event.

In many cases, the second scan may be unable to determine the value of one or more contextual values. Recording "blank" or "unable to determine" is acceptable. Over time, the nature and extent of the contextual values may be expanded as the system evolves in extracting/inferring more information. The richer the list of contextual values, the more the system may be able to infer about how the values affect failure rates.

The first scan in step S1-1 may also measure time taken to receive the last byte of the web page. The value of this factor is dependent on the value of the time taken to receive the first byte but in addition depends on the size of the requested page.

FIG. 2 is a flow diagram showing a set up process and association with the historical frequency determination in step S1. Prior to step S1, the methodology identifies the multiple websites (S7) and installs software that is capable of monitoring the multiple websites on an internet-connected server (S8). In this context, the first scan in step S1-1 may include running the software such that the internet-connected server requests each of the multiple websites to serve its home page (S1-1-1), measuring an elapsed time between when the request was made and when the home page began to arrive (S1-1-2), and preserving data values obtained from each request linked with an identity of each of the multiple websites (S1-1-3).

The analyses in steps S3 and S4 serve to produce the following outputs:

(1) Arrive at a definition of "firing events," i.e., whether a given deterioration in latency is (a) part of the normal daily/weekly/seasonal ups and downs; (b) a result of planned down time; or (c) a possible firing event. (2) Given specific minimum/maximum time ranges, determine the frequency of firing events for websites in general. This is useful when establishing general price ranges, negotiating with risk partners, etc. (3) Determining "subset" patterns for websites with a particular OS or web server or the like so the system can accommodate websites falling into one of these subsets. (4) Calculate a probability/frequency of firing events for a specific website.

Figure 4:
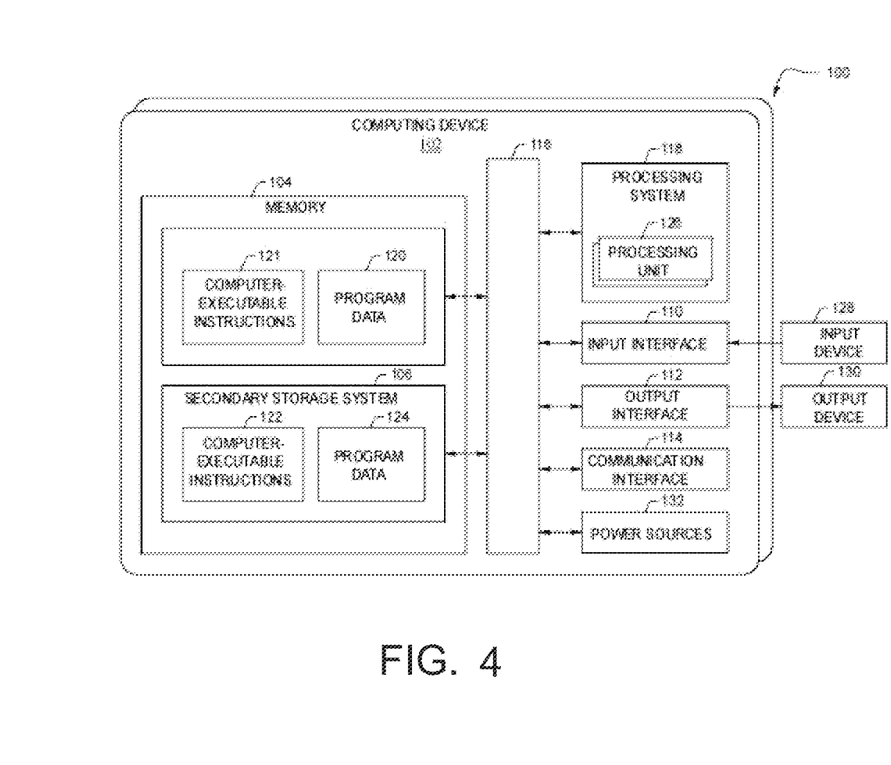
FIG. 4 is a schematic drawing showing an exemplary computer system.

In some applications, the system is administered using a computer system. Any known computer configuration capable of carrying out the intended functionality of the preferred embodiments may be used. FIG. 4 is a block diagram of an example configuration of a computer system 100 in which the techniques of this disclosure may be implemented. In the example of FIG. 4, computer system 100 comprises a computing device or control circuit 102 and one or more other computing devices. Computer system 100 or similar computing systems implement the system. Computing device 102 is an electronic device that processes information. In the example of FIG. 4, computing device 102 comprises a data storage system 104, a memory 108, a secondary storage system 106, a processing system 118, an input interface 110, an output interface 112, a communication interface 114, one or more power sources 132, and one or more communication media 116. Communication media 116 enable data communication between processing system 118, input interface 110, output interface 112, communication interface 114, memory 108, and secondary storage system 106. Computing device 102 can include components in addition to those shown in the example of FIG. 4. Furthermore, some computing devices do not include all of the components shown in the example of FIG. 4. Each of components 104, 106, 108, 110, 112, 114, 116, 118, 120, 121, 122, 124, 126, 128, 130, and 132 can be interconnected (physically, communicatively, or operatively) for inter-component communications.

Data storage system 104 is a system that stores data for subsequent retrieval. In the example of FIG. 4, data storage system 104 comprises memory 108 and secondary storage system 106. Memory 108 and secondary storage system 106 store data for later retrieval. In the example of FIG. 4, memory 108 stores computer-executable instructions 121 and program data 120. Secondary storage system 106 stores computer-executable instructions 122 and program data 124. Physically, memory 108 and secondary storage system 106 each comprise one or more computer-readable storage media.

A computer-readable medium is a medium from which a processing system can read data. Computer-readable media include computer storage media and communications media. Computer storage media can further include physical devices that store data for subsequent retrieval. Computer storage media are not transitory. For instance, computer storage media do not exclusively comprise propagated signals. Computer storage media include volatile storage media and non-volatile storage media. Example types of computer storage media include random-access memory (RAM) units, read-only memory (ROM) devices, solid state memory devices, optical discs (e.g., compact discs, DVDs, BluRay discs, etc.), magnetic disk drives, electrically-erasable programmable read-only memory (EEPROM), programmable read-only memory (PROM), magnetic tape drives, magnetic disks, and other types of devices that store data for subsequent retrieval. Communication media includes media over which one device can communicate data to another device. Example types of communication media include communication networks, communications cables, wireless communication links, communication buses, and other media over which one device is able to communicate data to another device.

Referring again to FIG. 4, processing system 118 is coupled to data storage system 104. Processing system 118 reads computer-executable instructions (e.g., 121, 122) from data storage system 104 and executes the computer-executable instructions. Execution of the computer-executable instructions by processing system 118 configures and/or causes computing device 102 to perform the actions indicated by the computer-executable instructions. For example, execution of the computer-executable instructions by processing system 108 can configure and/or cause computing device 102 to provide Basic Input/Output Systems (BIOS), operating systems, system programs, application programs, or can configure and/or cause computing device 102 to provide other functionality.

Processing system 118 reads the computer-executable instructions from one or more computer-readable media. For example, processing system 118 reads and executes computer-executable instructions 121 and 122 stored on memory 108 and secondary storage system 106.

Processing system 118 comprises one or more processing units 126. Processing units 126 comprise physical devices that execute computer-executable instructions. Processing system 118 can also include one or more operating systems that are executable by computing device 102. Processing units 126 comprise various types of physical devices that execute computer-executable instructions. For example, one or more of processing units 126 comprise a microprocessor, a processing core within a microprocessor, a digital signal processor, a graphics processing unit, or another type of physical device that executes computer-executable instructions.

Input interface 110 enables computing device 102 to receive input from an input device 128. Input device 128 comprises a device that receives input from a user. Input device 128 comprises one or more various types of devices that receive input from users. For example, input device 128 comprises a keyboard, a touch screen, a mouse, a microphone, a keypad, a joystick, a brain-computer interface device, or another type of device that receives input from a user. In some examples, input device 128 is integrated into a housing of computing device 102. In other examples, input device 128 is outside a housing of computing device 102.

Output interface 112 enables computing device 102 to output information on one or more output devices 130. One or more output devices 130, in some examples, are configured to provide output to a user using tactile, audio, or video output. For example, an output device 130 is a device that displays output. Example types of display devices include monitors, touch screens, display screens, televisions, and other types of devices that display output. In some examples, output device 130 is integrated into a housing of computing device 102. In other examples, output device 130 is outside a housing of computing device 102. Output devices 130, in one example, includes a presence-sensitive screen or a touch screen. Output devices 130 can utilize a sound card, a video graphics adapter card, or any other type of device for converting a signal into an appropriate form understandable to humans or machines. Additional examples of output device 130 include a speaker, a cathode ray tube (CRT) monitor, a liquid crystal display (LCD), or any other type of device that can generate intelligible output to a user.

Communication interface 114 enables computing device 102 to send and receive data over one or more communication media. In some examples, computing device 102 utilizes one or more communication interfaces 114 to wirelessly communicate with an external device such as server device or a client device, a mobile phone, or other networked computing device. Communication interface 114 comprises various types of devices. For example, communication interface 114 comprises a Network Interface Card (NIC), a wireless network adapter, a Universal Serial Bus (USB) port, or another type of device that enables computing device 102 to send and receive data over one or more communication media. In some examples, communications interface 114 comprises a network interface to communicate with external devices via one or more networks, such as one or more wireless networks. Examples of communications interface 114 are an Ethernet card, an optical transceiver, a radio frequency transceiver, or any other type of device that can send and receive information. Other examples of such network interfaces include Bluetooth®, cellular (e.g., 3G, 4G, 5G) and Wi-Fi® radios in mobile computing devices. In some examples, communication interface 114 receives configuration data, trial data, and/or other types of data as described above. Furthermore, in some examples, communication interface 114 outputs information and/or other types of data as described above.

Computing device 102, in some examples, includes one or more power sources 132, which may be rechargeable and provide power to computing device 102. In some examples, the one or more power sources 132 are one or more batteries. The one or more batteries could be made from nickel-cadmium, lithium-ion, or any other suitable material. In another example, the one or more power sources 132 include a power supply connection that receives power from a power source external to computing device 102.

The techniques described herein may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described herein. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described herein may also be embodied or encoded in a computer-readable medium, such as a computer-readable storage medium, containing instructions. Instructions embedded or encoded in a computer-readable medium, including a computer-readable storage medium, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method of measuring probability of a single asystemic website impairment event over a predefined period of time of a subject web page, the method comprising:
   (a) determining a historical frequency of firing events across multiple websites by:
      (1) conducting a first scan of the multiple websites, and measuring a time to first byte for each of the multiple websites, and
      (2) conducting a second scan of the multiple websites, and measuring contextual values that affect normalcy/impairment of the subject web page;
   (b) performing supervised training by selecting a subset of the multiple websites, defining an impaired state model for each website in the subset of the multiple websites, and identifying occurrences of impaired states for each website in the subset of the multiple websites;
   (c) analyzing a result of the first scan to identify websites among the multiple websites having a probability of an impaired state based on the impaired state model defined in the supervised training performed in step (b);
   (d) measuring from the analyzing in step (c) a frequency of occurrence of global firing events for all of the multiple websites; and
   (e) calculating a probability of local firing events for the subject web page,
   wherein the impaired state model identifies a normal range for the time to first byte for each website in the subset of the multiple websites, the impaired state model defining the impaired states when the time to first byte exceeds the normal range by at least 100-1000%.

2. The method according to claim 1, further comprising determining a correlation of the contextual values measured in step (a) to the probability of the impaired state, and adjusting the probability of the impaired state.

3. The method according to claim 2, wherein the contextual values comprise at least one of web server type, operating system type, and web site host provider.

4. The method according to claim 1, wherein the first scan is conducted at a higher frequency than the second scan.

5. The method according to claim 4, wherein the first scan is conducted every 5-10 minutes, and wherein the second scan is conducted once per month and at pre-designated times.

6. The method according to claim 5, wherein the second scan is conducted when a web page size changes and/or when an impairment state is detected.

7. The method according to claim 1, wherein step (a)(1) comprises measuring a time to last byte for each of the multiple websites.

8. The method according to claim 1, further comprising, prior to step (a), identifying the multiple websites, and installing software that is capable of monitoring the multiple websites on an Internet-connected server, wherein step (a) is practiced by running the software such that the Internet-connected server requests each of the multiple websites to serve its home page, measuring an elapsed time between when the request was made and when the home page began to arrive, and preserving data values obtained from each request linked with an identity of each of the multiple web sites.

9. The method according to claim 1, wherein the impaired state model defines the impaired states when the time to first byte exceeds the normal range for a predetermined period of time.

10. A method of determining a probability of website impairment for a subject web page in order to define a price for an impairment warranty, the method comprising:
   (a) determining a baseline time to first byte for a plurality of websites;
   (b) defining an impaired state model for a subset of the plurality of websites, and identifying occurrences of impaired states for each website in the subset;

(c) using the impaired state model defined in step (b), identifying websites among the plurality of websites having a probability of an impaired state;
(d) measuring a frequency of impairment occurrence for all of the plurality of websites; and
(e) calculating the probability of website impairment for the subject web page based on the frequency measured in step (d), wherein the impaired state model identifies a normal range for time to first byte for each website in the subset of the multiple websites, the impaired state model defining the impaired states when the time to first byte exceeds the normal range by at least 100-1000%.

11. The method according to claim 10, wherein step (a) is practiced by determining a historical frequency of firing events across the plurality websites by:
(1) conducting a first scan of the plurality of websites, and measuring an active time to first byte for each of the plurality of websites, and
(2) conducting a second scan of the multiple websites, and measuring contextual values that affect normalcy/impairment of the subject web page.

12. The method according to claim 11, wherein the first scan is conducted at a higher frequency than the second scan.

13. The method according to claim 12, wherein the first scan is conducted every 5-10 minutes, and wherein the second scan is conducted once per month and at pre-designated times.

14. The method according to claim 10, further comprising, prior to step (a), identifying the plurality of websites, and installing software that is capable of monitoring the multiple websites on an Internet-connected server, wherein step (a) is practiced by running the software such that the Internet-connected server requests each of the plurality of websites to serve its home page, measuring an elapsed time between when the request was made and when the home page began to arrive, and preserving data values obtained from each request linked with an identity of each of the plurality of websites.

* * * * *